United States Patent
Smith et al.

(10) Patent No.: US 8,649,149 B1
(45) Date of Patent: Feb. 11, 2014

(54) DUAL LEVEL SURGE PROTECTOR CIRCUIT FOR TELECOMMUNICATION LINE

(75) Inventors: Brian C. Smith, Madison, AL (US); Daniel M. Joffe, Owens Crossroads, AL (US)

(73) Assignee: Adtran, Inc., Huntsville, AL (US)

( * ) Notice: Subject to any disclaimer, the term of this patent is extended or adjusted under 35 U.S.C. 154(b) by 359 days.

(21) Appl. No.: 13/041,470

(22) Filed: Mar. 7, 2011

(51) Int. Cl.
   H02H 1/04 (2006.01)
(52) U.S. Cl.
   USPC .......................................................... 361/119
(58) Field of Classification Search
   USPC .......................................................... 361/119
   See application file for complete search history.

(56) References Cited

U.S. PATENT DOCUMENTS

| | | | |
|---|---|---|---|
| 4,282,555 A * | 8/1981 | Svedberg | 361/56 |
| 4,922,382 A | 5/1990 | Hobbins | 361/424 |
| 5,440,441 A | 8/1995 | Ahuja | 361/62 |
| RE35,854 E * | 7/1998 | Pezzani et al. | 361/56 |
| 5,943,404 A | 8/1999 | Sansom et al. | 379/93.06 |
| 6,084,761 A | 7/2000 | Casey et al. | 361/119 |
| 6,229,814 B1 | 5/2001 | McMillian et al. | 370/420 |
| 6,459,559 B1 * | 10/2002 | Christofersen | 361/124 |
| 6,757,382 B1 | 6/2004 | Wilkes, Jr. et al. | 379/399.01 |
| 6,985,491 B2 | 1/2006 | McMillian et al. | 370/420 |
| 7,271,991 B2 * | 9/2007 | Hoopes | 361/119 |
| 7,433,365 B1 | 10/2008 | Burch et al. | 370/437 |
| 7,539,298 B1 | 5/2009 | Ruble | 379/326 |
| 7,760,624 B1 | 7/2010 | Goodson et al. | 370/228 |

FOREIGN PATENT DOCUMENTS

| | | | |
|---|---|---|---|
| EP | 0 776 117 | 1/1999 | H04M 1/74 |
| EP | 2 043 216 | 4/2009 | H02H 3/093 |

* cited by examiner

*Primary Examiner* — Rexford Barnie
*Assistant Examiner* — Tien Mai
(74) *Attorney, Agent, or Firm* — Fish & Richardson P.C.

(57) ABSTRACT

In accordance with a non-limiting example, a dual level surge protector adaptively selects the protection level required in response to any expected voltages that will be applied to the tip and ring lines. In one example, the surge protector has a first set value for responding to an applied battery voltage and a second set value for responding to a combination voltage that includes a battery voltage plus a ringing voltage.

22 Claims, 3 Drawing Sheets

US 8,649,149 B1

DUAL LEVEL SURGE PROTECTOR CIRCUIT FOR TELECOMMUNICATION LINE

FIELD OF THE INVENTION

The present invention relates to protection devices for telecommunication lines, and more particularly, this invention relates to surge protectors used with telecommunication cables that include tip/ring lines.

BACKGROUND OF THE INVENTION

Telecommunication line protection devices are used to protect telephone line and similar telecommunication transmission and switching equipment from power-line contact, electrical strikes and the electromagnetic pulses carried across the telecommunication lines, such as created by a lightning strike or similar electromagnetic event that induces voltages in the telecommunication line. A telecommunication line protector, e.g., a surge protector, is typically required for each telephone or telecommunications subscriber line.

Most tip/ring (T/R) type POTS (Plain Old Telephone Service) circuits use a line card access switch (LCAS) to connect battery feed current and ringing to the T/R conductors. To support long T/R loops, a ringing voltage of 95 to about 100 volts RMS is superimposed on the negative battery feed, resulting in voltages as high as −200 volts or +100 volts on the ring lead. A protection device such as a surge protector is typically set to clamp around 250 volts to about 270 volts to protect the LCAS from unexpected surges resulting from lightning strikes and similar sources. This surge protector or other protection device, however, typically does not turn on during normal operation. A line card access switch typically uses a field effect transistors (FETs) having a breakdown voltage of around 300 volts, which is near the value of any surge protector setting. When undesired transient potentials approach the breakdown voltage of the field effect transistors in the line card access switch, then the field effect transistors are often stressed, thereby reducing the reliability of the line card access switch. Therefore, there is a desire to improve the reliability of a line card access switch due to voltage stress on the field effect transistors.

SUMMARY OF THE INVENTION

In accordance with a non-limiting example, a dual level surge protector for a line card access switch adaptively selects the protection level required in response to any expected voltages that will be applied to the tip and ring lines. In one example, the surge protector has a first set value for responding to an applied battery voltage and a second set value for responding to a combination voltage that includes a battery voltage plus a ringing voltage.

In a non-limiting example, an adaptive surge protector protects a telecommunication line and includes a first surge protector having a first turn-on voltage. This first surge protector is coupled to the telecommunication line. A second surge protector has a second turn-on voltage and the second surge protector is connected to the first surge connector and ground. A switch is connected across the second surge protector and configured to operate in open and closed states. When the switch is open, current flows from the telecommunications line through both first and second surge protectors to ground. When the switch is closed, the second surge protection device is bypassed. A controller provides a signal to the switch in response to the transmission status of a telecommunication device, such as an access card, coupled to the line and configuring the switch in either an open or closed state as required by line states.

In another example, an adaptive surge protector protects the telecommunication cable and includes a first surge protector having a first turn-on voltage. This first surge protector is coupled to the telecommunication line. A second surge protector has a second turn-on voltage and is connected to the cable. A switch, such as a blocking switch, is connected in series with the second surge protector. When the switch is closed, current flows from the telecommunications line through both first and second surge protectors to ground when the switch is open current is blocked. A controller provides a signal to the switch in response to the transmission status of an access card of a telecommunication system coupled to the cable.

In one example, the telecommunications line is formed as a telecommunications cable that includes tip and ring lines. Parallel surge protectors can be connected respectively to tip and ring lines and connected respectively in series to the second surge protector. In an example, the first and second surge protectors are formed as sidactors and the switch is formed as first and second Field Effect Transistors each having a body diode and in series with each other. One of the body diodes has a maximum peak inverse voltage (PIV) rating that exceeds a maximum trigger voltage of the second surge protector.

In another example, a telecommunications system includes a communications cable that is formed as tip and ring lines. An adaptive, dual-level surge protector circuit is connected to the tip and ring lines. This system includes a tip surge protector connected to the tip line and a ring surge protector connected to the ring line. A grounded surge protector is connected to each of the tip and ring surge protectors in the ground. A control circuit is configured to output first and second control voltages.

In an example, a switch is connected across the grounded surge protector into the control circuit and includes first and second Field Effect Transistors. Each has a body diode and forms a bidirectional switch. It is responsive to the first control voltage from the control circuit to place the switch in a closed state. This grounded surge protector is shorted out, limiting the tip and ring voltages to less than the voltages of tip and ring surge protectors. It is also responsive to the second control voltage from the control circuit to place the switch in an open state and configure the grounded surge protector in series with the tip and ring surge protectors and limit the tip and ring voltages to the sum of the tip or ring and grounded surge protectors. The tip, ring and grounded surge protectors are formed as sidactors, in one example, and when the switch is in an open state, the tip and ring voltages are limited to the sum of the firing voltages of the sidactors forming the tip or ring and grounded surge protectors. When the switch is in a closed state, the grounded sidactor is shorted, limiting the tip and ring line voltages to lessen the firing voltages of the tip and ring sidactors.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
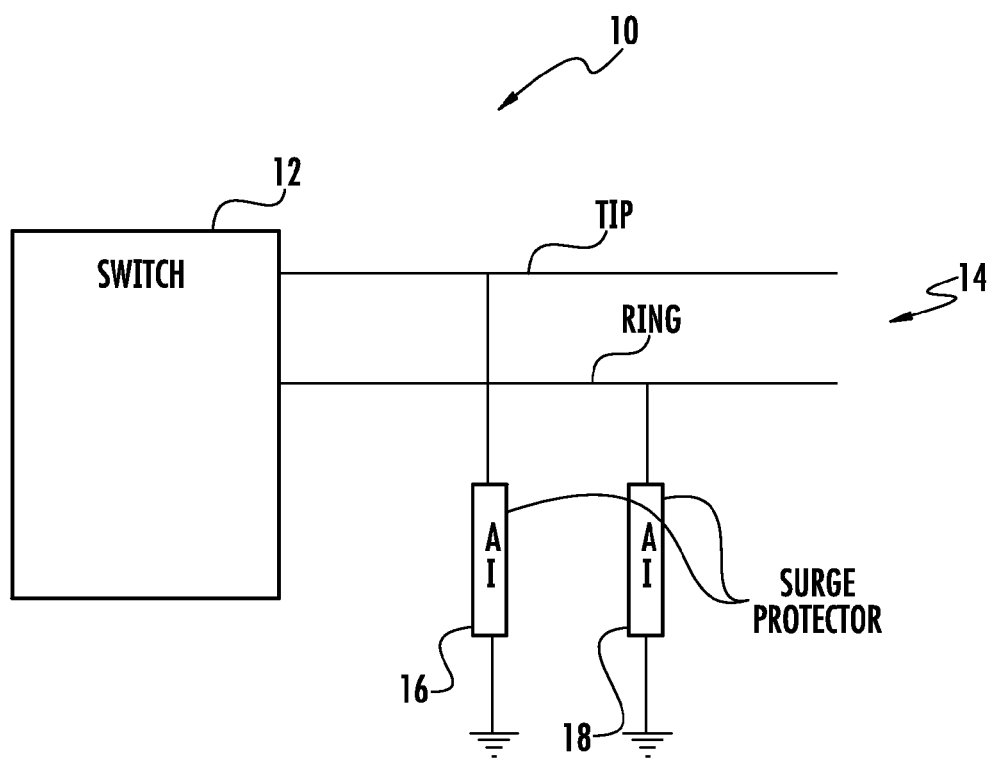
FIG. 1 is a block diagram showing a prior art telecommunication line protection system.

FIG. 1 illustrates a prior art telecommunication system 10 having a Line Card Access Switch (LCAS) 12 that includes a wire pair as a communications cable 14 connected thereto with a tip line (T) and ring line (R). A surge protector 16 is connected between the tip line and ground and another surge protector 18 is connected between the ring line and ground. Such system could be incorporated with a device as part of a central office, for example, the devices manufactured and sold by ADTRAN, INC. of Huntsville, Ala.

Figure 2:
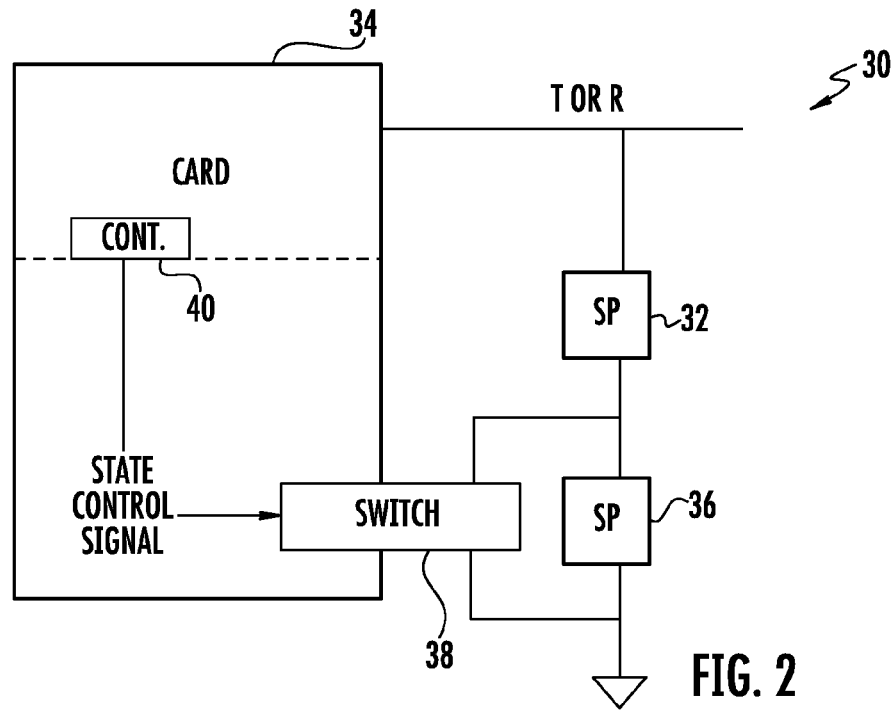
FIG. 2 is a block diagram of an example of a first embodiment of an adaptive surge protection system for a telecommunication line in accordance with a non-limiting example.

In accordance with a non-limiting example, a first embodiment of an adaptive surge protector system 30 is formed as a dual level surge protector system and illustrated in FIG. 2. This dual level surge protector system 30 provides better protection for on-board components than a single level protector system. For example, when the system uses a POTS battery feed, in the talk state and when on-hook, the tip and ring voltages are typically between 0 and −50 volts. The dual level surge protector system 30 as illustrated could be set to a low voltage during these states and a higher voltage during the ring state. This result provides an enhanced, lower protection voltage during the time that the circuit is not ringing. The various surge protectors as explained below can be formed using sidactors in one example.

FIG. 2 illustrates this adaptive surge protector system as a line card protector circuit in which the surge protectors are arranged in a series connection. The first surge protector (SP) 32 has a first turn-on voltage and is coupled to the telecommunication line or cable that could be a tip or ring lead as illustrated. This cable connects to a line card 34, also called access card, such as part of a telecommunications device, for example, a Total Access device as manufactured by ADTRAN, INC. of Huntsville, Ala. An example could be a Total Access, carrier class, multi-service access and aggregation platform. The second surge protector (SP) 36 has a second turn-on voltage and is connected to the first surge connector 32 and ground. The line card can include a switch 38 as a state control switch, which is connected across the second surge protector 36 in parallel as illustrated. The switch could be a line card access switch or a separate switch or remote. A controller 40, such as part of the line card, provides an activation signal to the switch 38 in response to the transmission status of the line card as a telecommunication device coupled to the telecommunication cable or line, for example, the tip or ring lead. When the switch is open, the surge protectors are in series and provide series protection for the two surge protectors 32 and 36 as a high voltage protection. When the switch is closed, the second surge protector 36 is bypassed and protection is provided by only the first surge protector 32. The turn-on voltage of the first surge protector 32 is set at a value that improves the reliability of the line card.

Figure 3:
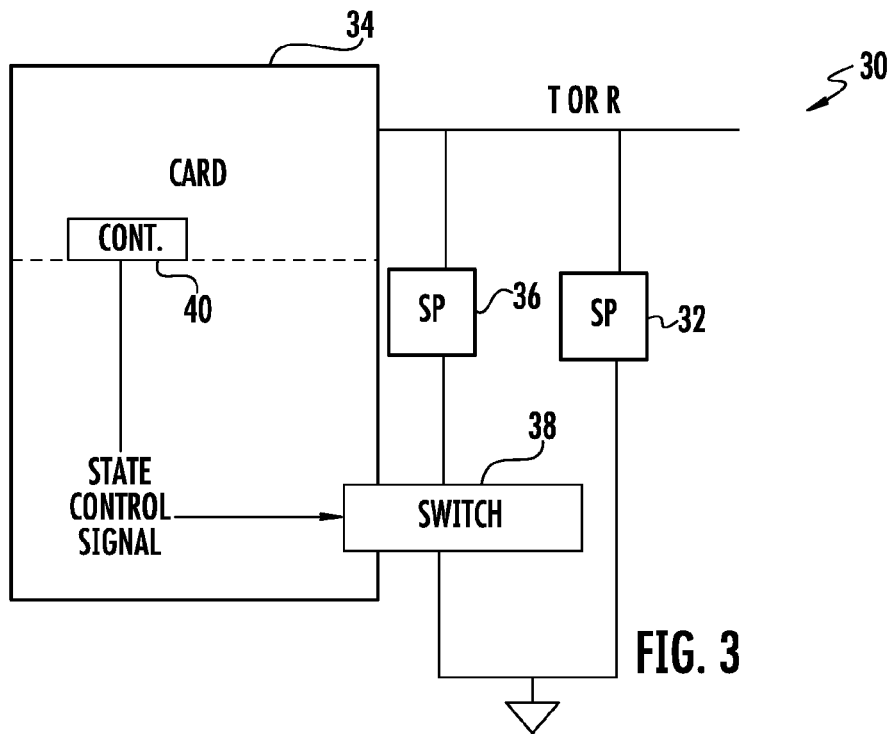
FIG. 3 is a block diagram of an example of a second embodiment of an adaptive surge protector system for a telecommunication line in accordance with a non-limiting example.

As illustrated in another embodiment shown in FIG. 3, the surge protector system 30 includes a first surge protector 32 having a first turn-on voltage and coupled to the cable, which could be one of the tip or ring leads of the cable as illustrated. That cable connects to the line card 34 or other telecommunications device. A second surge protector 36 has a second turn-on voltage and is connected to the telecommunication line. The switch 38 is formed as a blocking switch and is connected in series with one of the surge protectors and in the illustrated example, the first surge protector 32. A controller 40 such as part of the line card provides a state control signal as an activation signal to the switch in response to the transmission status of the access card in the telecommunication system coupled to the cable.

Figure 4:
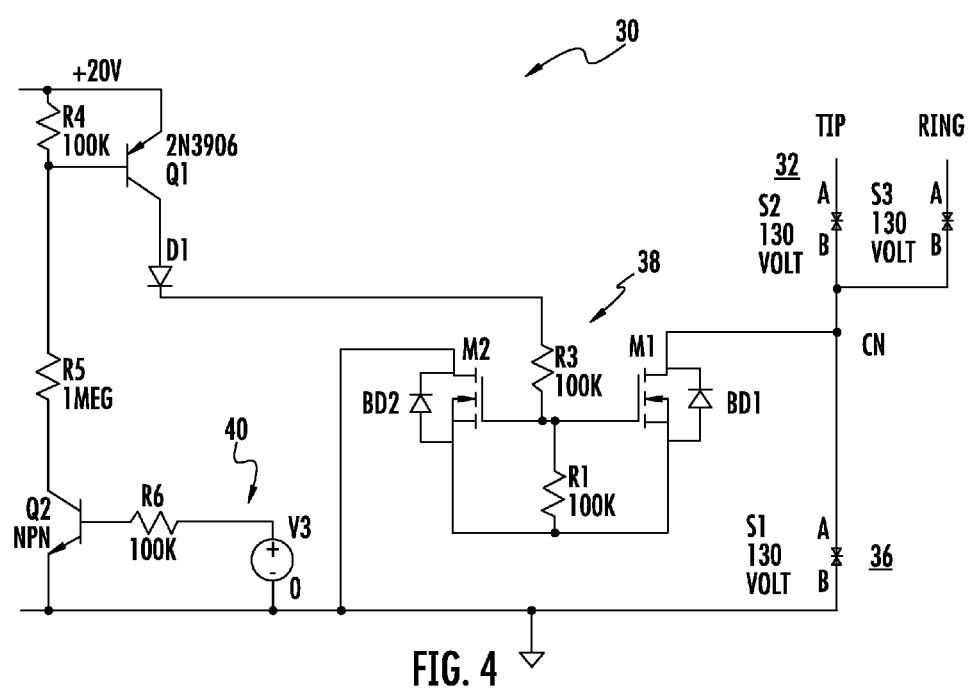
FIG. 4 is a schematic circuit diagram of the adaptive, dual-level surge protector system in accordance with a non-limiting example.

FIG. 4 is a schematic circuit diagram of an adaptive surge protector system 30 configured as a dual surge protector circuit that can be used in accordance with a non-limiting example. V3 represents a logic control signal that changes protection levels. M1 and M2 form a bidirectional switch under control of V3. The bidirectional switch can correspond to switch 38 in FIGS. 2 and 3 and V3 and any associated circuit components can correspond to the controller 40 of FIGS. 2 and 3 in an example. When the switch formed by M1 and M2 is closed, it shorts across sidactor S1, limiting tip and ring voltages to less than the firing voltages of S2 and S3. Sidactor S1 can correspond to the second surge 36 protector shown in FIGS. 2 and 3. In one example, S2 and S3 correspond to the location of the first surge protector. When the switch is open, tip and ring voltages are limited to the sum of S1 and S2 (S3) firing voltages.

When V3 is low, Q2 and Q1 are off, no current flows in R3, and Vgs=O for M1 and M2. This opens the path from the drain of M1 to the drain of M2. The MOSFET body diodes (BD1 and BD2) are in series, but the configuration has common anodes, so there is no conduction through the body diodes. Diode D1 keeps Q1 from harm in the presence of Tip and Ring surges. D1 needs a max PIV rating that exceeds the maximum trigger voltage of S1.

If V3 is high (3.3 volts) then Q1 and Q2 turn on. This places about 1OV from gate to source on both M1 and M2. This shorts out S1, limiting the tip and ring voltage to 130 volts.

When V3 is low (0 volts), Q1 and Q2 turn off, effectively putting the S1 130V protector in series with the other protectors to ground. This limits the tip and ring voltage to 260V in this state.

The sidactor devices in one example are typically solid state transient voltage protectors that can be formed as a bidirectional device connected to the high side of a circuit and a common ground. In one example, a sidactor remains in a high off-state impedance until it senses a voltage exceeding its voltage break over ($V^{BO}$). When an overvoltage is sensed, the sidactor will clamp the voltage and transition through a positive or negative zener region until enough current is present to allow the device to crowbar into a low impedance state. As noted before, D1 in FIG. 4 requires a maximum peak inverse voltage rating that exceeds the maximum trigger voltage of S1. The peak inverse voltage is typically the maximum voltage that a diode can withstand in the reverse direction without breaking down or avalanching.

Many modifications and other embodiments of the invention will come to the mind of one skilled in the art having the benefit of the teachings presented in the foregoing descrip- That which is claimed is:

1. An adaptive surge protector system for protecting a telecommunications line, comprising:
    a first surge protector connected to the telecommunications line and having a first turn-on voltage;
    a second surge protector connected to the first surge protector and a ground and having a second turn-on voltage;
    a switch connected across the second surge protector and configured to operate in open and closed states, wherein when the switch is open current flows from the telecommunications line through both first and second surge protectors to ground and when the switch is closed the second surge protector is bypassed, wherein said switch comprises first and second Field Effect Transistors each having a body diode; and
    a controller connected to the switch and configured to provide a signal to the switch in response to a transmission status of a telecommunication device coupled to the telecommunication line and configuring the switch in either an open or a closed state.

2. The adaptive surge protector system according to claim 1, wherein said first and second surge protectors are series connected between the telecommunication line and said ground.

3. The adaptive surge protector system according to claim 1, wherein said telecommunications line comprises a telecommunications cable comprising Tip and Ring lines.

4. The adaptive surge protector system according to claim 1, and further comprising surge protectors connected respectively to Tip and Ring lines and each connected respectively in series to the second surge protector.

5. The adaptive surge protector system according to claim 1, wherein said first and second surge protectors comprise sidactors.

6. The adaptive surge protector system according to claim 1, wherein said body diodes are configured in series with each other.

7. The adaptive surge protector system according to claim 1, wherein one of said body diodes has a maximum peak inverse voltage rating that exceeds a maximum trigger voltage of the second surge protector.

8. An adaptive surge protector system for protecting a telecommunications line, comprising:
    a first surge protector connected to the telecommunications line and a ground and having a first turn-on voltage;
    a second surge protector connected to the telecommunications line and the ground and having a second turn-on voltage;
    a switch connected between one of said first and second surge protectors and the ground and configured to operate in open and closed states, wherein when the switch is closed current flows from the telecommunications line through both first and second surge protectors to ground and when the switch is open current is blocked from passing from the telecommunications line through the surge protector to which the switch is connected and to the ground, wherein said switch comprises first and second Field Effect Transistors each having a body diode; and
    a controller connected to the switch and configured to provide a signal to the switch in response to a transmission status of a telecommunication device coupled to the telecommunication line and configuring the switch in either an open or a closed state.

9. The adaptive surge protector system according to claim 8, wherein said first and second surge protectors are connected between the telecommunications line and said ground.

10. The adaptive surge protector system according to claim 8, wherein said telecommunications line comprises a telecommunications cable comprising Tip and Ring lines.

11. The adaptive surge protector system according to claim 8, wherein said first and second surge protectors are both connected to one of a Tip or Ring line.

12. The adaptive surge protector system according to claim 8, wherein said first and second surge protectors comprise sidactors.

13. The adaptive surge protector system according to claim 8, wherein said body diodes are configured in series with each other.

14. The adaptive surge protector system according to claim 8, wherein one of said body diodes has a maximum peak inverse voltage rating that exceeds a maximum trigger voltage of the second surge protector.

15. A telecommunications system, comprising:
    a communications cable comprising a Tip and Ring line;
    an adaptive, dual-level surge protector circuit connected to said Tip and Ring lines, and comprising,
        a Tip surge protector connected to said Tip line and a Ring surge protector connected to said Ring line;
        a grounded surge protector connected to each of said Tip and Ring surge protectors and to ground;
        a control circuit configured to output first and second control voltages; and
        a switch connected across the grounded surge protector and to the control circuit and comprising first and second Field Effect Transistors each having a body diode and forming a bidirectional switch, and responsive to the first control voltage from the control circuit to place the switch in a closed state wherein the grounded surge protector is shorted out limiting the Tip and Ring voltages to less than voltages of Tip and Ring surge protectors, and responsive to the second control voltage from the control circuit to place the switch in an open state and configure the grounded surge protector in series with the Tip and Ring surge protectors and limit the Tip and Ring voltages to a sum of the Tip or Ring and grounded surge protectors.

16. The telecommunications system according to claim 15, wherein said Tip, Ring and grounded surge protectors comprise sidactors.

17. The telecommunications system according to claim 16, wherein when the switch is in an open state the Tip and Ring voltages are limited to a sum of the firing voltages of the sidactors forming the Tip or Ring and grounded surge protectors.

18. The telecommunications system according to claim 16, wherein when the switch is in a closed state the grounded sidactor is shorted, limiting the Tip and Ring line voltages to less than the firing voltages of the Tip and Ring sidactors.

19. The telecommunications system according to claim 15, wherein said switch comprises first and second Field Effect Transistors each having a body diode and in series with each other.

20. The telecommunications system according to claim 19, wherein said first and second Field Effect Transistors form a bidirectional switch.

21. The telecommunications system according to claim 19, wherein one of said body diodes has maximum peak inverse voltage rating that exceeds a maximum trigger voltage of the grounded surge protector.

22. The telecommunications system according to claim 15, and further comprising a telecommunication device connected to said Tip and Ring lines and comprising an access card connected therewith, wherein said switch is responsive to a transmission status of the access card.

\* \* \* \* \*